(12) United States Patent
Peake

(10) Patent No.: US 11,770,448 B1
(45) Date of Patent: *Sep. 26, 2023

(54) ROTATING OFFLINE STORAGE UNITS IN A DISPERSED STORAGE NETWORK

(71) Applicant: Pure Storage, Inc., Mountain View, CA (US)

(72) Inventor: Andrew G. Peake, Chicago, IL (US)

(73) Assignee: PURE STORAGE, INC., Santa Clara, CA (US)

( * ) Notice: Subject to any disclaimer, the term of this patent is extended or adjusted under 35 U.S.C. 154(b) by 902 days.

This patent is subject to a terminal disclaimer.

(21) Appl. No.: 16/557,723

(22) Filed: Aug. 30, 2019

Related U.S. Application Data

(63) Continuation of application No. 15/809,584, filed on Nov. 10, 2017, now Pat. No. 10,484,474, which is a continuation-in-part of application No. 15/425,128, filed on Feb. 6, 2017, now Pat. No. 10,841,376, which is a continuation of application No. 14/320,547, filed on Jun. 30, 2014, now Pat. No. 9,661,074.

(60) Provisional application No. 61/871,833, filed on Aug. 29, 2013.

(51) Int. Cl.
*H04L 67/1097* (2022.01)
*G06F 3/06* (2006.01)
*G06F 16/23* (2019.01)

(52) U.S. Cl.
CPC .......... *H04L 67/1097* (2013.01); *G06F 3/0608* (2013.01); *G06F 3/0614* (2013.01); *G06F 3/0641* (2013.01); *G06F 3/0644* (2013.01); *G06F 3/067* (2013.01); *G06F 16/2365* (2019.01); *G06F 3/0638* (2013.01)

(58) Field of Classification Search
CPC .............. H04L 67/1097; G06F 16/2365; G06F 3/0608; G06F 3/0614; G06F 3/0641; G06F 3/0644; G06F 3/067; G06F 3/0638
USPC ........................................................ 707/692
See application file for complete search history.

(56) References Cited

U.S. PATENT DOCUMENTS

| | | | |
|---|---|---|---|
| 4,092,732 | A | 5/1978 | Ouchi |
| 4,631,673 | A | 12/1986 | Haas et al. |
| 5,454,101 | A | 9/1995 | Mackay et al. |
| 5,485,474 | A | 1/1996 | Rabin |
| 5,774,643 | A | 6/1998 | Lubbers et al. |
| 5,802,364 | A | 9/1998 | Senator et al. |

(Continued)

OTHER PUBLICATIONS

Chung; An Automatic Data Segmentation Method for 3D Measured Data Points; National Taiwan University; pp. 1-8; 1998.

(Continued)

*Primary Examiner* — Hosain T Alam
*Assistant Examiner* — Saba Ahmed
(74) *Attorney, Agent, or Firm* — Garlick & Markison; Timothy D. Taylor

(57) ABSTRACT

A method begins by a computing device of a dispersed storage network (DSN) selectively bringing online and taking offline storage units of a set of storage units of the DSN. When bringing a first storage unit of the set of storage units online in accordance with the selectively bringing online and taking offline storage units, the method continues with the computing device determining a rebuilding approach of the first storage unit. The method continues with the computing device bringing the first storage unit online in accordance with the rebuilding approach.

16 Claims, 9 Drawing Sheets

(56) References Cited

U.S. PATENT DOCUMENTS

| | | | |
|---|---|---|---|
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B1 | 7/2007 | Cutts et al. |
| 7,272,613 B2 | 9/2007 | Sim et al. |
| 7,389,379 B1* | 6/2008 | Goel et al. ......... G06F 11/1662 714/6.32 |
| 7,636,724 B2 | 12/2009 | de la Torre et al. |
| 7,814,074 B2 | 10/2010 | Anglin et al. |
| 8,904,229 B1* | 12/2014 | Veeraswamy et al. ..................... G06F 11/1088 714/6.22 |
| 9,021,296 B1* | 4/2015 | Kiselev et al. ...... G06F 11/2058 714/6.23 |
| 9,223,653 B2 | 12/2015 | Storm et al. |
| 9,430,336 B2 | 8/2016 | Motwani et al. |
| 10,558,537 B1* | 2/2020 | Colgrove et al. ... G06F 11/2064 |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. et al. |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0226402 A1 | 9/2007 | Kohinata et al. |
| 2007/0234110 A1 | 10/2007 | Soran et al. |
| 2007/0283167 A1 | 12/2007 | Venters, III et al. |
| 2008/0016063 A1 | 1/2008 | Fuerst et al. |
| 2008/0183975 A1 | 7/2008 | Foster et al. |
| 2008/0222734 A1* | 9/2008 | Redlich et al. ...... H04L 9/3271 726/26 |
| 2009/0094251 A1 | 4/2009 | Gladwin et al. |
| 2009/0094318 A1 | 4/2009 | Gladwin et al. |
| 2009/0254601 A1 | 10/2009 | Moeller et al. |
| 2010/0023524 A1 | 1/2010 | Gladwin et al. |
| 2010/0332751 A1 | 12/2010 | Quigley et al. |
| 2011/0029711 A1 | 2/2011 | Dhuse et al. |
| 2011/0072321 A1 | 3/2011 | Dhuse |
| 2011/0184912 A1 | 7/2011 | Baptist et al. |
| 2011/0185141 A1 | 7/2011 | Dhuse et al. |
| 2011/0214064 A1* | 9/2011 | Schneider et al. .. G06F 16/2386 715/744 |
| 2012/0166487 A1 | 6/2012 | Stougie et al. |
| 2012/0278512 A1 | 11/2012 | Alatorre et al. |
| 2013/0019072 A1 | 1/2013 | Strasser et al. |
| 2013/0031155 A1 | 1/2013 | Terrano et al. |
| 2013/0138902 A1 | 5/2013 | Haustein et al. |
| 2014/0272536 A1 | 9/2014 | Beckley et al. |
| 2016/0098320 A1 | 4/2016 | Grube et al. |
| 2016/0373419 A1* | 12/2016 | Weigold et al. ....... G06Q 20/06 |

OTHER PUBLICATIONS

Harrison; Lightweight Directory Access Protocol (LDAP): Authentication Methods and Security Mechanisms; IETF Network Working Group; RFC 4513; Jun. 2006; pp 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp 1-12.

Legg; Lightweight Directory Access Protocol (LDAP): Syntaxes and Matching Rules; IETF Network Working Group; RFC 4517; Jun. 2006; pp 1-50.

M.A. Redfern, O Usta and G Fielding; "Protection against Loss of Utility Grid Supply for a Dispersed Storage and Generation Unit"; IEEE Transactions on Poer Delivery; Vol. 8, No. 3, Jul. 1993; Pgs. 948-954.

Plank, T1: Erasure Codes for Storage Applications; FAST2005, 4th Usenix Conference on File Storage Technologies; Dec. 13-16, 2005; pp. 1-74.

R.C. Dugan et al.; "Integrating Dispersed Storage and Generation (DSG) with an Automated Distribution System"; IEEE Transactions on Poer Apparatus and Systems, Vol. PAS-103; No. 6; Jun. 1984; pgs 1142-1146.

Rabin; Efficient Dispersal of Information for Security, Load Balancing, and Fault Tolerance; Journal of the Association for Computer Machinery; Vol. 36, No. 2; Apr. 1989; pp 335-348.

Satran, et al.; Internet Small Computer Systems Interface (iSCSI); IETF Network Working Group; RFC 3720; Apr. 2004; pp 1-257.

Sciberras; Lightweight Directory Access Protocol (LDAP): Schema for User Applications; IETF Network Working Group; RFC 4519; Jun. 2006; pp 1-33.

Sermersheim; Lightweight Directory Access Protocol (LDAP): The Protocol; IETF Network Working Group; RFC 1511; Jun. 2006; pp 1-68.

Shamir; How to Share a Secret; Communications of the ACM; Vol. 22, No. 11; Nov. 1979; pp 612-613.

Smith; Lightweight Directory Access Protocol (LDAP): String Representation of Search Filters; IETF Network Working Group; RFC 4515; Jun. 2006; pp 1-12.

Smith; Lightweight Directory Access Protocol (LDAP): Uniform Resource Locator; IETF Network Working Group; RFC 4516; Jun. 2006; pp 1-15.

Wildi; Java iSCSi Initiator; Master Thesis; Department of Computer and Information Science, University of Konstanz; Feb. 2007; 60 pgs.

(56) References Cited

OTHER PUBLICATIONS

Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Directory Information Models; IETF Network Working Group; RFC 4512; Jun. 2006; pp 1-49.
Zeilenga; Lightweight Directory Access Protocol (LDAP): Internationalized String Preparation; IETF Network Working Group; RFC 4518; Jun. 2006; pp 1-14.
Zeilenga; Lightweight Directory Access Protocol (LDAP): String Representation of Distinguished Names; IETF Network Working Group; RFC 4514; Jun. 2006; pp 1-15.
Zeilenga; Lightweight Directory Access Protocol (LDAP): Technical Specification Road Map; IETF Network Working Group; RFC 4510; Jun. 2006; pp 1-8.

* cited by examiner

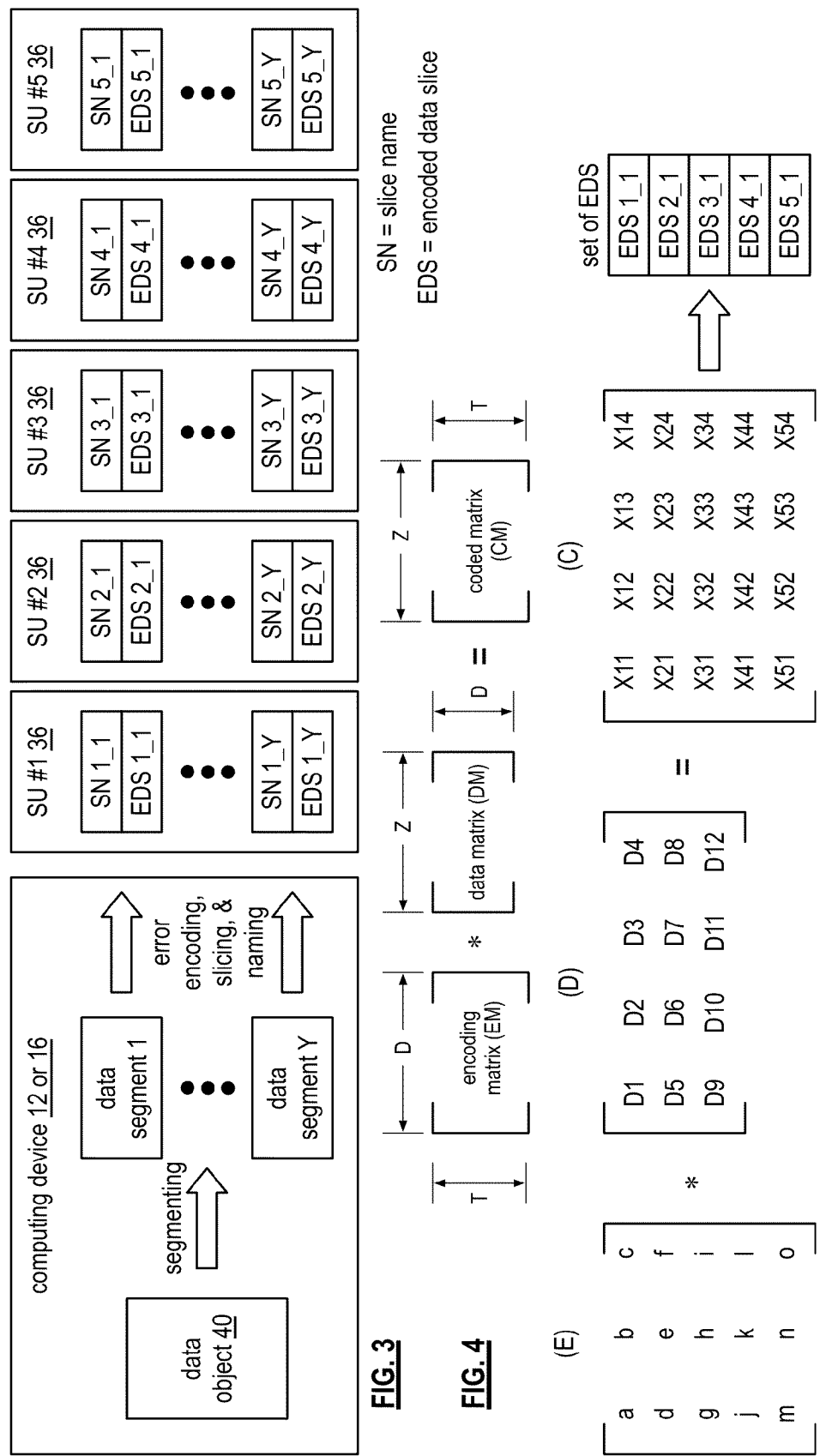

ROTATING OFFLINE STORAGE UNITS IN A DISPERSED STORAGE NETWORK

CROSS-REFERENCE TO RELATED APPLICATIONS

The present U.S. Utility Pat. Application claims priority pursuant to 35 U.S.C. § 120, as a continuation of U.S. Utility Pat. Application No. 15/809,584, entitled "ROTATING OFFLINE DS UNITS", filed Nov. 10, 2017, which is a continuation-in-part to U.S. Utility Pat. Application No. 15/425,128, entitled "DETECTION AND CORRECTION OF COPY ERRORS IN A DISTRIBUTED STORAGE NETWORK", filed Feb. 06, 2017, which is a continuation of U.S. Utility Pat. Application No. 14/320,547, entitled "UPDATING DE-DUPLICATION TRACKING DATA FOR A DISPERSED STORAGE NETWORK", filed Jun. 30, 2014, issued as U.S. Pat. No. 9,661,074 on May 23, 2017, which claims priority pursuant to 35 U.S.C. § 119(e) to U.S. Provisional Application No. 61/871,833, entitled "PRIORITIZING DATA RETENTION IN A DISPERSED STORAGE NETWORK", filed Aug. 29, 2013, now expired, all of which are hereby incorporated herein by reference in their entirety for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to rotating offline storage units of a dispersed storage network.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
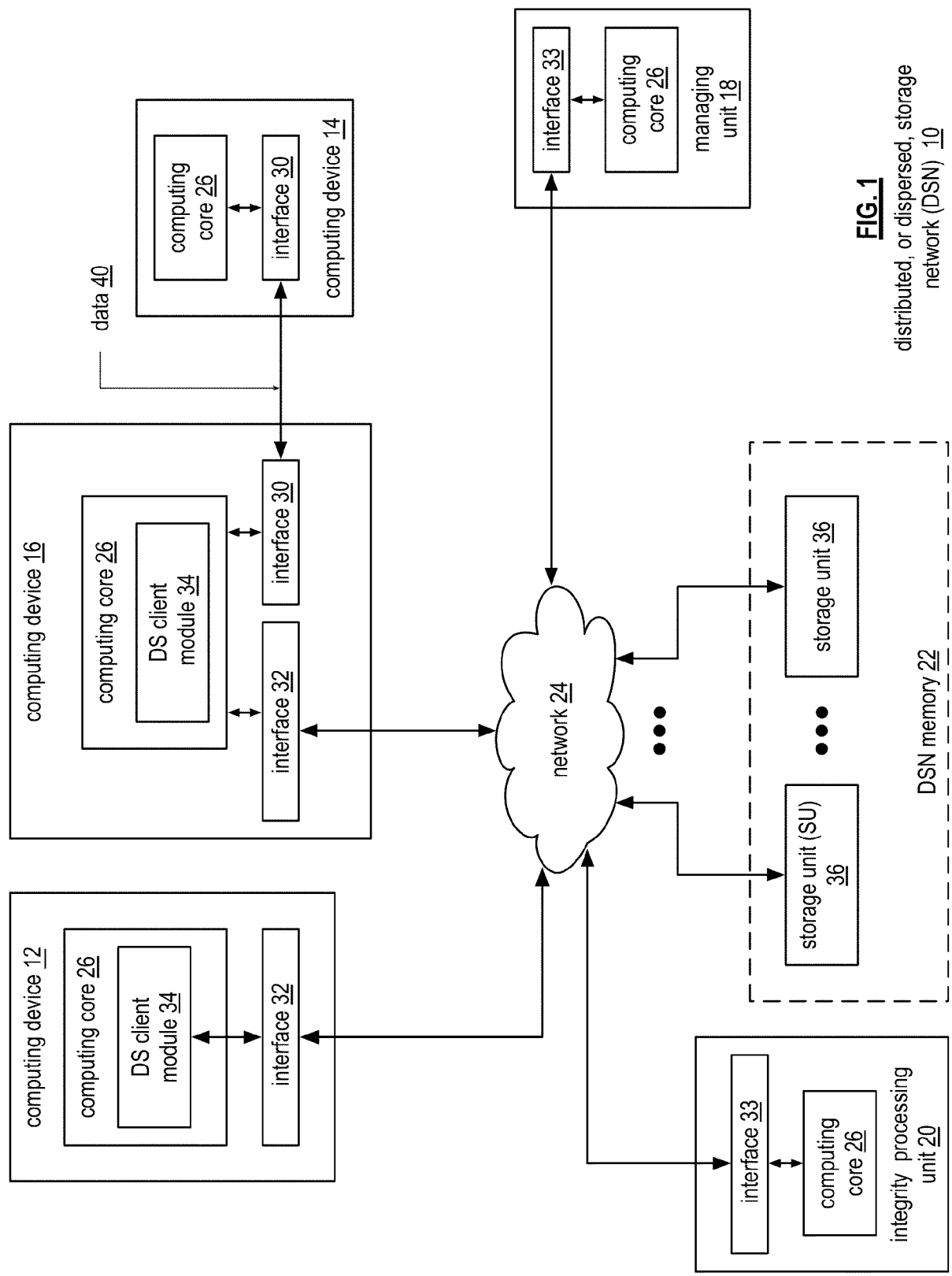
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12–6, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
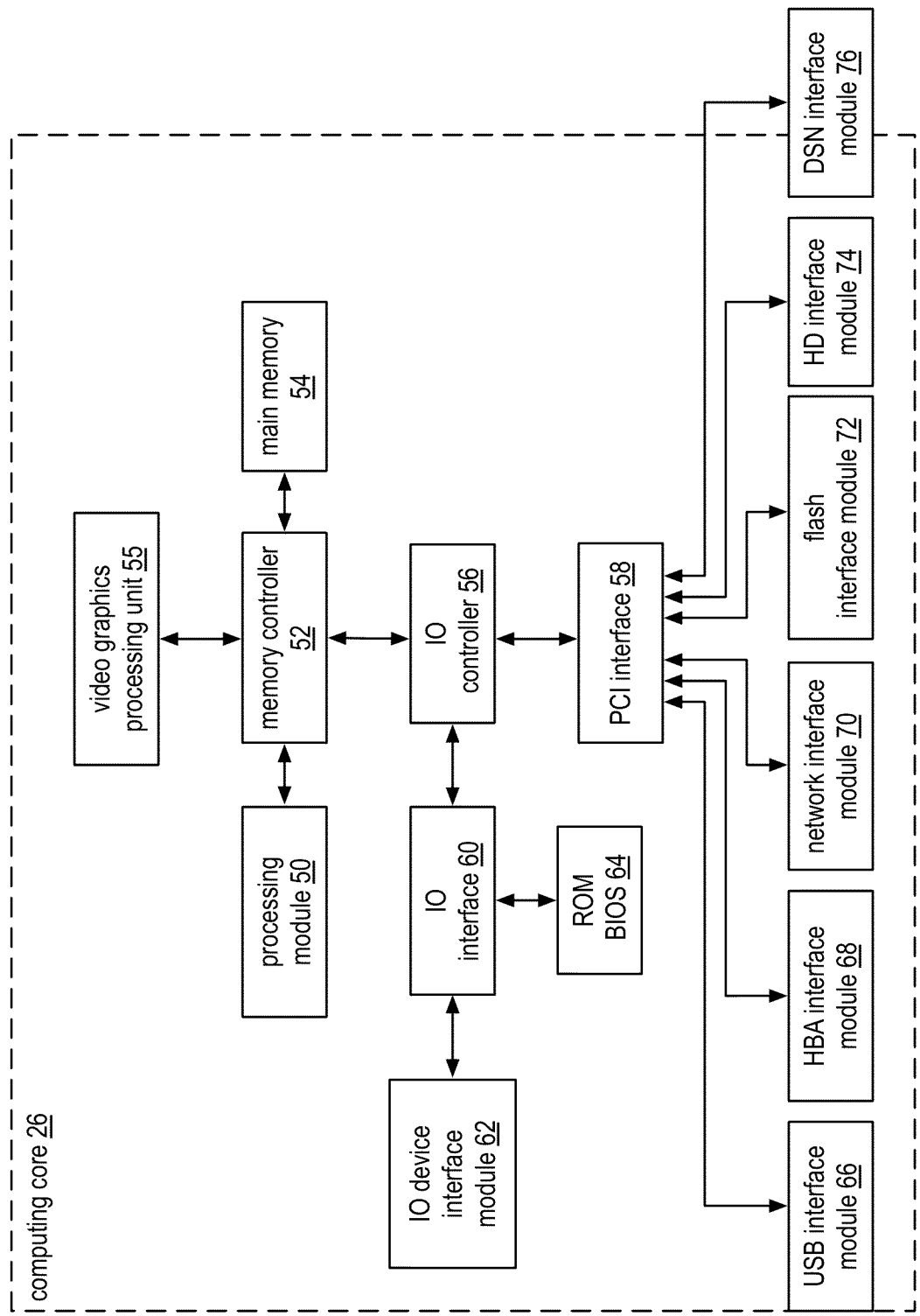
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12–6, the managing unit 18, and the integrity processing unit 20 include a computing core 26, which includes network interfaces 30-33. Computing devices 12–6 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12–16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data 40 as subsequently described with reference to one or more of FIGS. 3-8. In this example embodiment, computing device 16 functions as a dispersed storage processing agent for computing device 14. In this role, computing device 16 dispersed storage error encodes and decodes data (e.g., data 40) on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12–4 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12–16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1 – D12). The coded matrix includes five rows of coded data blocks, where the first row of X11 – X14 corresponds to a first encoded data slice (EDS 1_1), the second row of X21 – X24 corresponds to a second encoded data slice (EDS 2_1), the third row of X31 – X34 corresponds to a third encoded data slice (EDS 3_1), the fourth row of X41 – X44 corresponds to a fourth encoded data slice (EDS 4_1), and the fifth row of X51 – X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1 - Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
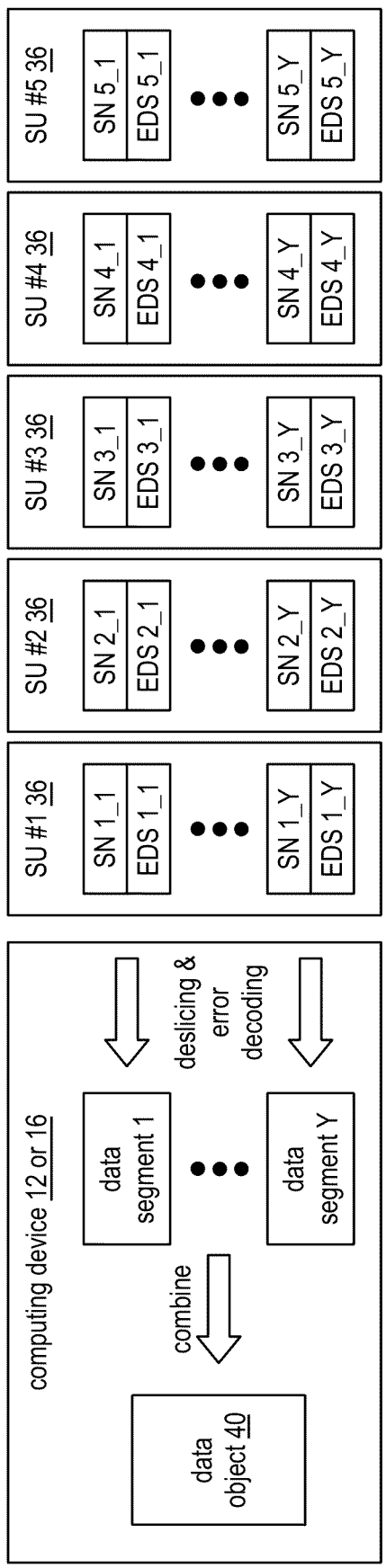
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
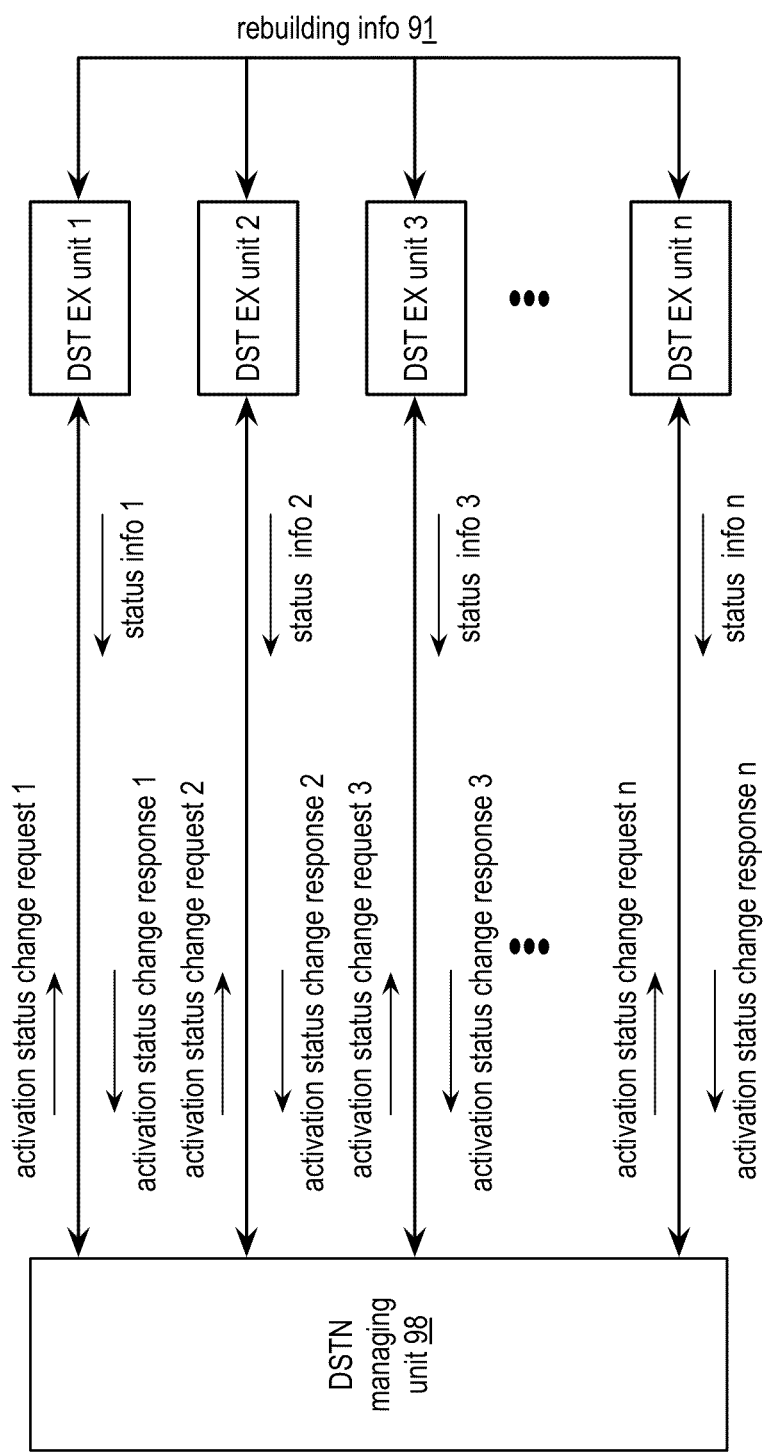
FIG. 9 is a schematic block diagram of another embodiment of a dispersed storage network in accordance with the present invention.

FIG. 9 is a schematic block diagram of another embodiment of a dispersed storage network (DSN) that includes a distributed storage and task network (DSTN) managing unit 98 and a set of DST execution units 1-n. Each DST execution unit may be implemented utilizing the storage unit 36 of FIG. 1. The DSTN managing unit may be implemented by utilizing the managing unit 18 of FIG. 1.

In an example of operation, the DSTN managing unit 98 obtains status information from the set of DST execution units 1-n as status information 1-n. The status information includes one or more of an availability indicator, an active indicator, a required for a rebuilding indicator, a requiring rebuilding indicator, identifiers of DST execution units required for rebuilding, the number of pending data access requests, a number of pending processing requests, and power utilization level information. The obtaining includes at least one of issuing a query, receiving a query response, receiving an error message, receiving an activation chain status response, and accessing a historical record.

The DSTN managing unit 98 selects a DST execution unit associated with an inactive status for reactivation in accordance with a rotation scheme and based on the status information, where a number of remaining DST execution units of the set of DST execution units is greater than or equal to a decode threshold number. The rotation scheme includes at least one of a round-robin scheme, an equal amount of downtime, and an equal amount of utilization. The selecting may be based on one or more of a power utilization level, a desired power utilization level, a number of desired active units, a desired reliability level, a desired availability level, and DST execution unit capabilities.

With the DST execution unit for reactivation selected, the DSTN managing unit 98 issues an activation status change request to the selected DST execution unit. The activation status change request includes one or more of a DST execution unit ID, a requested status (e.g., not active, active), and a status transition approach (e.g., immediately, at a scheduled future timeframe, when no current or pending data access request exists, when no current or pending rebuilding activity exists). As a specific example, the activation status change request includes a request to reactivate and a transition approach for immediate transition (e.g., alternatively for a scheduled transition in accordance with at least one of a transition schedule and a request).

The DSTN managing unit 98 receives a favorable activation status change response from the selected DST execution unit for reactivation. The activation status change response includes one or more of the DST execution unit identifier, the requested status, the actual status, a number of current or pending data access requests, a number of current or pending rebuilding tasks, and an estimated time to status transition when not immediate. As a specific example, the activation status change response includes an indicator that the DST execution unit is now active.

With the DST execution units selected for reactivation now active, the DSTN managing unit 98 selects another DST execution unit associated with an active status for deactivation in accordance with the rotation scheme and based on the status information, where a number of remaining DST execution units of the set of DST execution units is greater than or equal to a decode threshold number. The selecting may be based on one or more of a power utilization level, a desired power utilization level, a number of desired active units, a desired reliability level, a desired availability level, DST execution unit capabilities, and identifying a DST execution unit associated with a number of pending tasks that is less than a low pending tasks threshold level (e.g., few or no pending partial task processing tasks, few or no pending data access tasks).

With the other DST execution units selected for deactivation, the DSTN managing unit 18 determines a transition approach for the other DST execution unit based on the status information (e.g., immediately, scheduled, after pending tasks are executed). As a specific example, the DSTN managing unit 98 determines the transition approach to be the immediate approach when a priority of estimated power savings is greater than all other priorities. As another specific example, the DSTN managing unit 98 determines the transition approach to be after the pending tasks are executed when the pending tasks include critical rebuilding tasks and the critical rebuilding tasks are associated with a priority that is greater than all other priorities. With the transition approach determined, the DSTN managing unit 98 issues and activation status change request to the other DST execution unit, where the activation status change request includes the transition approach and a request to deactivate. The method to change activation status is discussed in greater detail with reference to FIGS. 10 and 11.

From time to time, one or more of the DST execution units rebuilds encoded data slices associated with slice errors. The rebuilding includes scanning for errors and remedying the errors. The DST execution units share rebuilding information 91. The rebuilding information 91 includes one or more of a list slice request, a list slice response, a read slice request, a read slice response, a partial slice request, and a partial slice response. The scanning for errors includes a DST execution unit associated with an active status issuing list slice requests to other active DST execution units and receiving list slice responses for comparison to identify slice errors. The remedying includes an active DST execution unit obtaining at least a decode threshold number of representations of encoded data slices of a set of encoded data slices where at least one encoded data slice is associated with a slice error. The obtaining includes issuing one or more of read slice requests and read partial slice requests to active DST execution units and receiving one or more of read slice responses and read partial slice responses. The obtaining further includes waiting for required DST execution units to become active prior to sending of the one or more of the read slice requests and the read partial slice requests. The method of rebuilding is discussed in greater detail with reference to FIG. 13.

Figure 10:
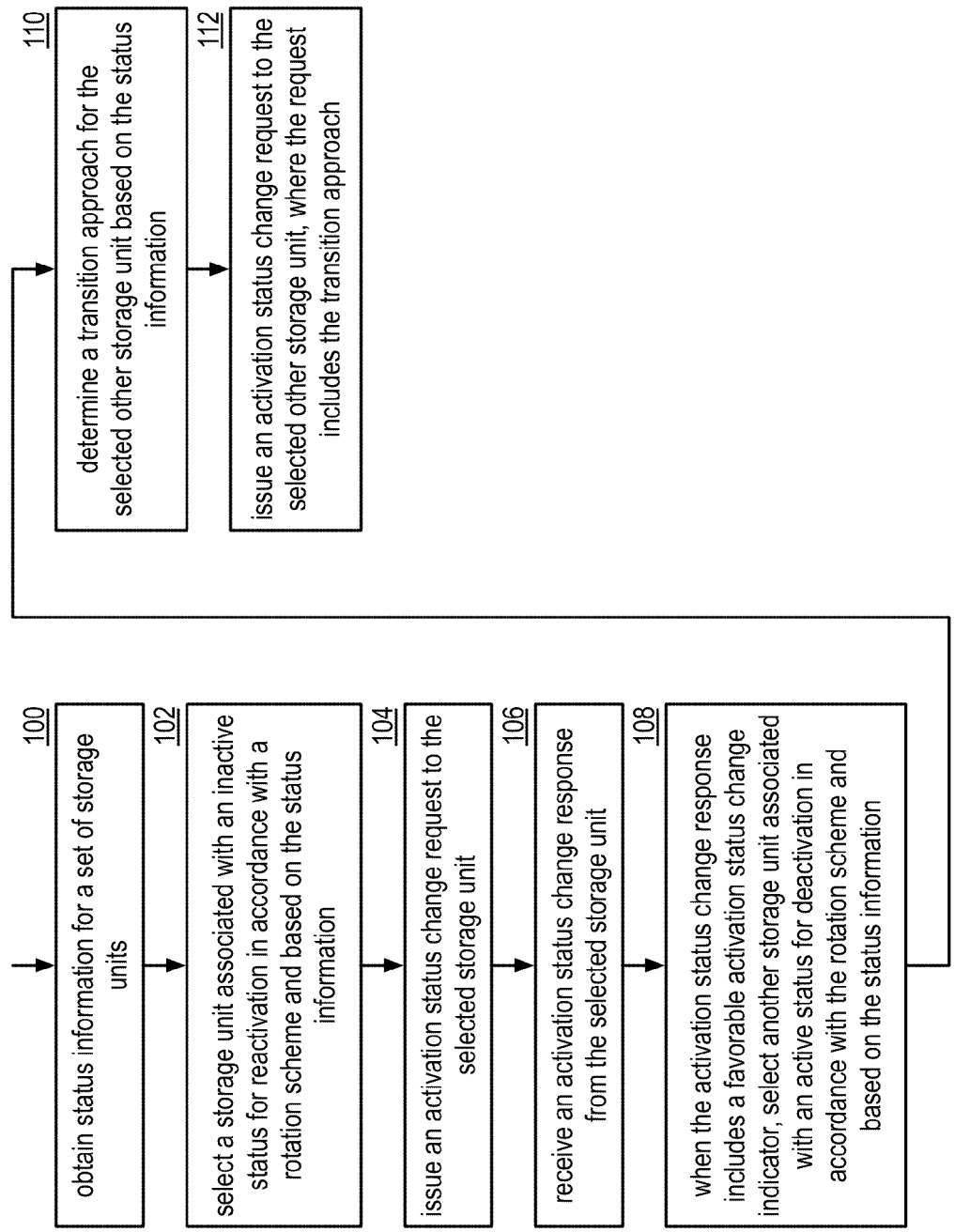
FIG. 10 is a flowchart illustrating an example of selecting active storage units in accordance with the present invention.

FIG. 10 is a flowchart illustrating an example of selecting active storage units. The method continues at step 100 where a processing module (e.g., of a distributed storage and task network (DSTN) managing unit) obtains status information for a set of storage units. The method continues at step 102 where the processing module selects a storage unit associated with an inactive status for reactivation in accordance with a rotation scheme and based on the status information. As a specific example, the processing module selects a next storage unit of a storage unit rotation list, where the storage unit is associated with an available and inactive status. The method continues at step 104 where the processing module issues and activation status change request to the selected storage unit to reactivate the storage unit. The method continues at step 106 where the processing module receives an activation status change response from the selected storage unit indicating that the storage unit has been reactivated.

When the activation status change response includes a favorable activation status change indicator (e.g., indicating that the selected storage unit has been reactivated), the method continues at step 108 where the processing module selects another storage unit associated with an active status for deactivation in accordance with the rotation scheme and based on the status information. As a specific example, the processing module selects the other storage unit where the other storage unit is associated with no pending storage or rebuilding tasks. The method continues at step 110 where the processing module determines a transition approach for the selected other storage unit based on the status information. As a specific example, the processing module determines the transition approach to include transitioning after pending tasks have been processed when the status information indicates that the other storage unit is associated with pending rebuilding or data access tasks. The method continues at step 112 where the processing module issues and activation status change request to the selected other storage unit, where the request includes the transition approach and an indicator to deactivate the selected other storage unit.

Figure 11:
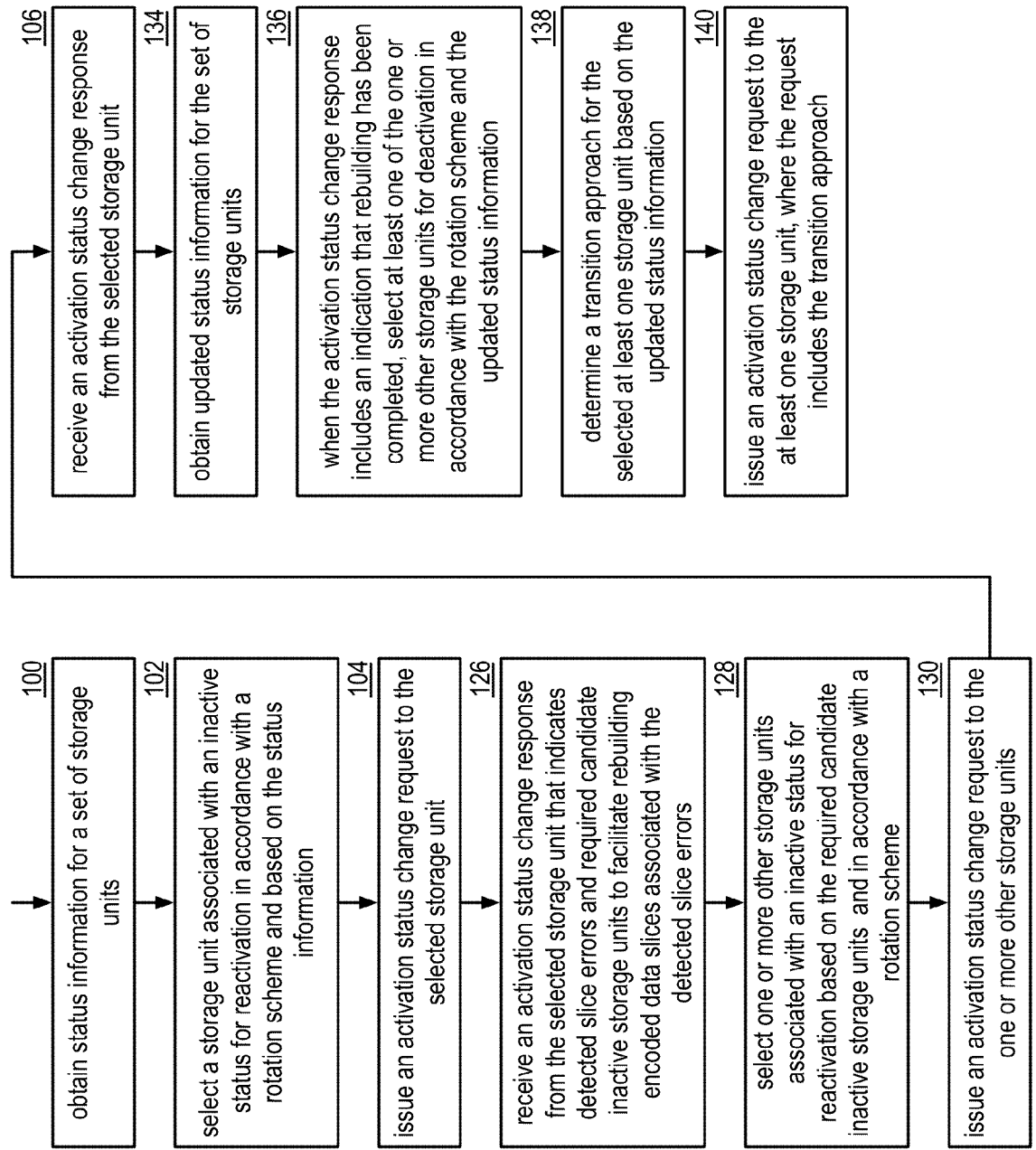
FIG. 11 is a flowchart illustrating an example of enabling slice rebuilding in accordance with the present invention.

FIG. 11 is a flowchart illustrating an example of enabling slice rebuilding, which includes similar steps to FIG. 10. The method continues with steps 100-104 of FIG. 10 where a processing module (e.g., of a distributed storage and task network (DSTN) managing unit) obtains status information for a set of storage units, selects a storage unit associated with an inactive status for reactivation in accordance with a rotation scheme and based on the status information, and issues an activation status change request to the selected storage unit.

The method continues at step 126 where the processing module receives an activation status change response from the selected storage unit that indicates detected slice errors and required candidate in active storage units to facilitate rebuilding encoded data slices associated with the detected slice errors. As a specific example, the selected storage unit scans for the slice errors and issues the activation status change response after determining that a decode threshold number of other storage units are not available to facilitate rebuilding.

The method continues at step 128 where the processing module selects one or more other storage units associated with an inactive status for reactivation based on the required candidate in active storage units and in accordance with a rotation scheme. As a specific example, the processing module selects a storage unit that is scheduled for reactivation soon in accordance with the rotation scheme that is included in the required candidate in active storage units. The method continues at step 130 where the processing module issues and activation status change request to the one or more other storage units requesting reactivation.

The method continues with step 106 of FIG. 10 where the processing module receives an activation status change response from the selected storage unit (e.g., after rebuilding). The method continues at step 134 where the processing module obtains updated status information for the set of storage units. When the activation status change response includes an indication that rebuilding has been completed, the method continues at step 136 where the processing module selects at least one of the one or more other storage units for deactivation in accordance with the rotation scheme and the updated status information. As a specific example, the processing module selects the other storage unit where the other storage unit is associated with no pending rebuilding tasks for the selected storage unit.

The method continues at step 138 where the processing module determines a transition approach for the selected at least one storage unit based on the updated status information. As a specific example, the processing module indicates the transition approach to be immediately since rebuilding has been completed for the selected storage unit. As another specific example, the processing module indicates the transition approach to be after processing of the rebuilding tasks associated with other storage units. The method continues at step 140 where the processing module issues an activation status change request of the at least one storage unit, where the request includes the transition approach.

Figure 12:
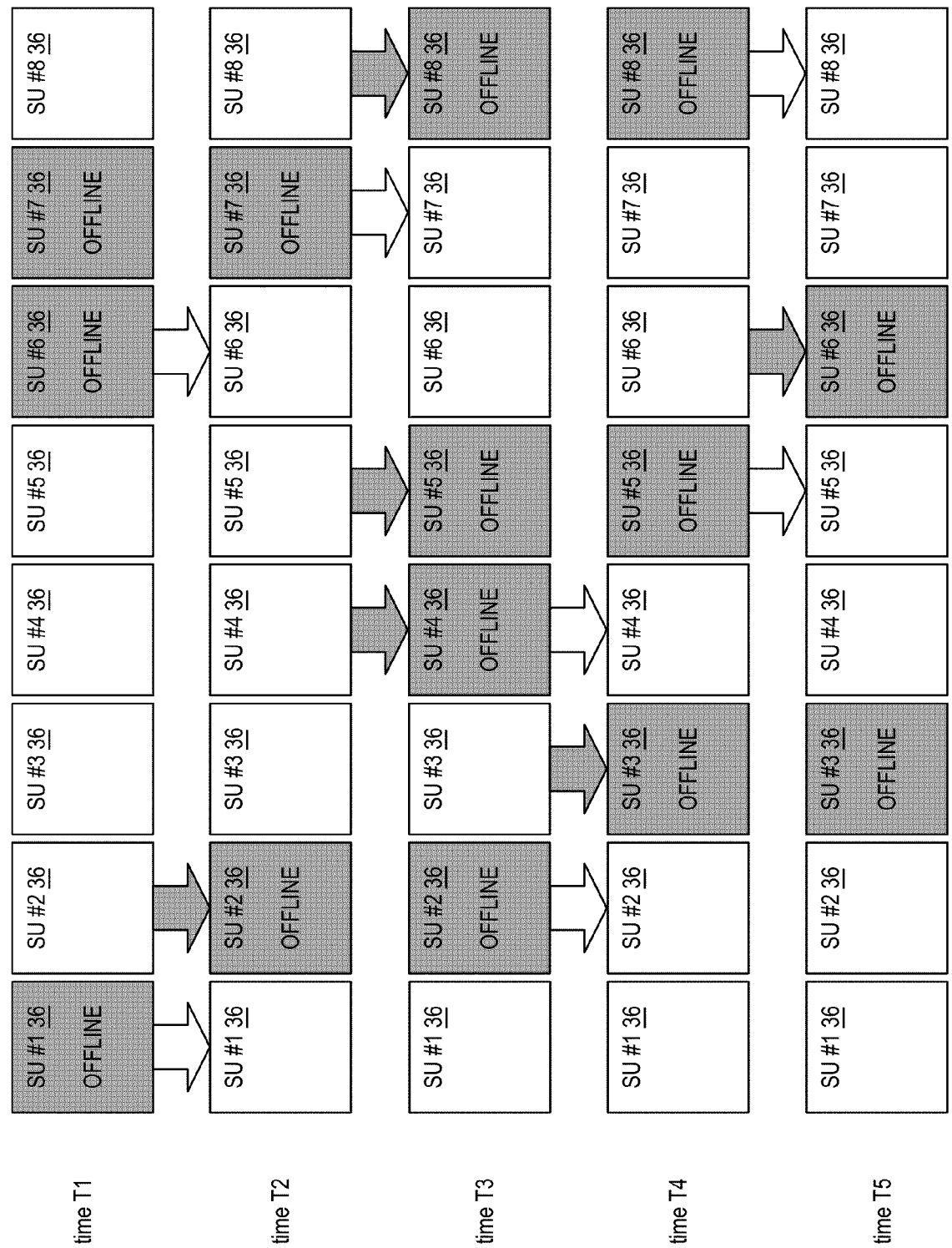
FIG. 12 is a schematic block diagram of an example of selectively bringing online and taking offline storage units in accordance with the present invention.

FIG. 12 is a schematic block diagram of an example of selectively bringing online and taking offline storage units of a set of storage units of a dispersed storage network (DSN). As illustrated, eight storage units SU #1-8 36 are selectively brought online and taken offline during five times T1-T5 (e.g., where a time interval is in minutes, hours, days, weeks, etc.). The selectively bringing online and taking offline storage units includes one or more of a scheduled timeframe, an amount of power consumed by a storage unit of the set of storage units, an amount of data written to a storage unit of the set of storage units, restricting taking offline a storage unit that includes an encoded data slice that needs rebuilding, restricting taking offline a storage unit that includes an encoded data slice that is critical to a rebuilding of another encoded data slice, and determining a storage unit of the set of storage units will not be available during a scheduled online timeframe (e.g., the storage units includes one or more hard drive failures, but still may have many other functioning hard drives).

The selectively bringing online and taking offline storage units may also be determined according to rotation priority levels. For example, a first rotation priority level may include restricting taking offline a storage unit that includes an encoded data slice that needs rebuilding, a second rotation priority level may include an amount of power consumed by a storage unit of the set of storage units, and a third rotation priority level may include a scheduled timeframe. For example, when the third rotation priority indicates that a sixth storage unit should remain online, the second rotation priority indicates that the sixth storage unit should be taken offline and the first priority is null (e.g., no encoded data slices stored in the sixth storage unit needed for rebuilding), the computing device may take the sixth storage unit offline (e.g., due to the second rotation priority level being a highest non-null priority).

In an example of operation, a decode threshold number is 3, a read threshold number is 4, a write threshold number is 5 and a pillar width number is 8. During a first time T1, storage units 1, 6 and 7 are offline and storage units 2-5 and 8 are online. Also during the first time T1 (and any other times), a computing device may update or write sets of encoded data slices to the set of storage units according to a dispersed storage network storage protocol (e.g., DS error encoding parameters). For example, encoded data slices of the sets are written to the online storage units SU #2-5 and #7 and encoded data slices to be written in the offline storage units (e.g., SU #1, #6, and #7) are not. The encoded data slices for the offline storage units may be stored in cache memory of a DS processing unit until the offline storage unit is available, sent to a proxy storage unit (e.g., an online SU) until the offline storage unit corresponding to the encoded data slice for storage is online, and/or added to a rebuild list. In one example, when a storage unit comes online and an encoded data slice previously stored in the newly online storage unit is determined to need rebuilding (e.g., is missing, is outdated, etc.), a computing device may send a corresponding rebuilt encoded data slice to the newly online storage unit. As another example, when a storage unit comes online, an encoded data slice of a set of encoded data slices of the newly online storage unit that is determined to need rebuilding is rebuilt by obtaining other encoded data slices of the set of encoded data slices from other online storage units of the set of storage units. Note the rebuilding may be done by the newly online storage unit or another computing device (e.g., other storage unit, DS processing unit, managing unit, etc.) of the DSN.

At time T2, a computing device of the DSN determines the selectively bringing online and taking offline storage units (e.g., according to a DSN protocol) indicates that storage units 1, 3, 4, 5, 6 and 8 are to be online and storage units 2 and 7 are to be offline. The computing device brings the first and sixth storage units online (e.g., by sending an activate message, a command, etc.) and determines a rebuilding approach for the first and sixth storage units. The rebuilding approach includes an expedited rebuilding procedure, a normal rebuild procedure, a full rebuilding technique (e.g., a rebuilding agent reconstructs a data segment and re-encodes it to produce a rebuilt slice), and/or a partial rebuilding. The partial rebuilding approach includes each storage unit of a decode threshold number of storage units performing a two-step process to generate partial slice rebuilding data. In the first step, a storage unit performs a partial decoding of an encoded data slice of a set of encoded data slices using selected rows of the decoding matrix. This produces a partial decode matrix. In the second step, the storage unit matrix multiplies the partial decode matrix with a reduced encode matrix to produce the partial slice rebuilding data. A function (e.g., an exclusive OR function) is performed on the partial slice rebuilding data to generate a rebuilt encoded data slice.

When the rebuilding approach is the expedited rebuilding procedure the computing devices sends a command to the first storage unit to rebuild encoded data slices at an accelerated rate in comparison to the normal rate. For example, the normal rate of rebuilding consumes 5-10% of processing resource of a device (e.g., storage unit, computing device, etc.) and the accelerated rate consumes greater than 10% of the processing resources.

In addition to determining a rebuilding process, the computing device determines a transition approach for taking storage units offline; in this example, taking storage units 2 and 7 off line. To render this decision, the computing device gathers data regarding the encoding parameters (e.g., decode threshold, write threshold, read threshold, and pillar width), amount of data written into the DSN since the last transition, an estimated time to rebuild encoded data slices, system reliability, and/or system use levels. For example, the computing device determines to take both storage units 2 and 7 offline as soon as storage units 1 and 6 are back on line when the system use level is relatively low, system reliability is high, the amount of time to rebuild encoded data slices is low, and there will be a write threshold number of storage units still online. As another example, the computing device determines to leave one or both of storage units 2 and 7 online until one or both of storage units 1 and 6 have had their respective encoded data slices rebuilt when the conditions are different than in the preceding example.

At time T3, a computing device of the DSN determines the selectively bringing online and taking offline storage units indicates that storage units 1, 3, 6 and 7 are to be online and storage units 2, 4, 5 and 8 are to be offline. Thus, the computing device brings online storage unit 7 and determines a rebuilding approach for encoded data slices that are stored or to be stored in the storage unit 7. For example, the computing device determines that once storage units 4, 5 and 8 are taken offline, four storage units (e.g., SU #1, 3, 6 and 7) will be online, which is less than the write threshold and at the read threshold. Thus, the computing device may keep one or more of storage units 4, 5 and 8 online while encoded data slices stored or to be stored in SU #7 are rebuilt. Note the computing device may also restrict one or more of storage units 4, 5 and 8 from going offline while storage units 4, 5 and 8 are storing data that is needed for a rebuilding process in other storage units of the set of storage units.

Note that during time T3, a write threshold number of storage units are not online. Thus, the set of storage unit may perform reads but may not perform a write operation during this time, and the computing device may determine to perform expedited rebuilding upon bringing online storage units 2 and 4 for time t4. Alternatively, the computing device may determine to adjust the write threshold (e.g., lowering the write threshold to 4 for time period t3). Further alternatively, a DS processing unit may determine to cache encoded data slices to be stored in storage unit 4 for time t3 to continue writing processes. The DS processing unit may then, at time t4, send an activation message to storage unit 4 with encoded data slices to be stored in storage unit 4.

At time T4, a computing device of the DSN determines the selectively bringing online and taking offline storage units indicates that storage units 1, 2, 4, 6 and 7 are to be online and storage units 3, 5 and 8 are to be offline. At time T5, a computing device of the DSN determines the selectively bringing online and taking offline storage units indicates that storage units 1, 2, 4, 5, 7 and 8 are to be online and storage units 3 and 6 are to be offline.

Figure 13:
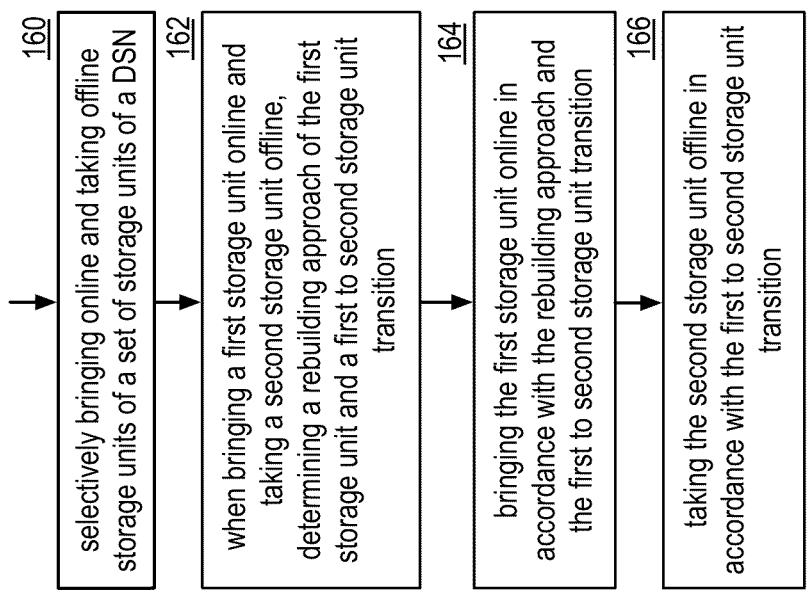
FIG. 13 is a flowchart illustrating an example of rotating offline storage units of a dispersed storage network (DSN) in accordance with the present invention.

FIG. 13 is a flowchart of a method of an example of rotating offline storage units of a dispersed storage network (DSN). The method begins with step 160, where a computing device of the DSN selectively brings online and takes offline storage units of a set of storage units of the DSN. When bringing a first storage unit of the set of storage units online and taking a second storage unit of the set of storage units offline in accordance with the selectively bringing online and taking offline storage units, the method continues with step 162 where the computing device determines a rebuilding approach of the first storage unit and a first to second storage unit transition.

The method continues with step 164, where the computing device brings the first storage unit online in accordance with the rebuilding approach and the first to second storage unit transition. As an example of the determining the rebuilding approach and the first to second storage unit transition, when the number of online storage units is at or below a read threshold once the second storage unit is offline, the computing device may determine to rebuild an encoded data slice of the first storage unit before the second storage unit goes offline. As another example of the determining the rebuilding approach and the first to second storage unit transition, when the number of online storage units is at or above a write threshold once the second storage unit is offline, the computing device may determine to rebuild an encoded data slice of the first storage unit after the second storage unit goes offline.

The method continues with step 166, where the computing device takes the second storage unit offline in accordance with the first to second storage unit transition. As an example, the computing device keeps the second storage unit online (e.g., according to a rotating priority level, a DSN protocol, a change to the selectively taking offline and bringing online storage units, etc.). As another example, the computing device may take the second storage unit offline after data of the first storage unit is rebuilt. As yet another example, the computing device may take the second storage offline once the first storage unit is online.

As another example, when bringing the first storage unit and a third storage unit of the set of storage units online and taking the second storage unit and a fourth storage unit of the set of storage units offline, in accordance with the selectively bringing online and taking offline storage units, the computing device determines a second rebuilding approach of the first and third storage units and a first and third to second and fourth storage unit transition.

Next, the computing device brings the first and third storage units online in accordance with the second rebuilding approach and the first and third to second and fourth storage unit transition and takes the second and fourth storage units offline in accordance with the first and third to second and fourth storage unit transition. In this example, the computing device concurrently rebuilds according to the second rebuilding approach and the third to second and fourth storage unit transition, one or more sets of encoded data slices of the first and third storage units that need rebuilding.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
rotating offline storage units of a set of storage units of a dispersed storage network (DSN) by selectively, by a computing device of the DSN, bringing online and taking offline storage units of the set of storage units, wherein the selectively bringing online and taking offline storage units comprises one or more of a scheduled timeframe, an amount of power consumed by a storage unit of the set of storage units, an amount of data written to a storage unit of the set of storage units, restricting taking offline a storage unit that includes an encoded data slice that needs rebuilding, restricting taking offline a storage unit that includes an encoded data slice that is critical to a rebuilding of another encoded data slice, and determining a storage unit of the set of storage units will not be available during a scheduled online timeframe;
when bringing a first storage unit of the set of storage units online in accordance with the selectively bringing online and taking offline storage units, determining, by the computing device, a rebuilding approach for data stored or to be stored in the first storage unit; and
bringing, by the computing device, the first storage unit online in accordance with the rebuilding approach.

2. The method of claim 1 further comprises:
when taking a second storage unit of the set of storage units offline in accordance with the selectively bringing online and taking offline storage units:
determining a first to second storage unit transition;
bringing, by the computing device, the first storage unit online in accordance with the first to second storage unit transition; and
taking, by the computing device, the second storage unit offline in accordance with the first to second storage unit transition.

3. The method of claim 2, wherein the first to second storage unit transition comprises one of:
keeping the second storage unit online;
taking the second storage unit offline after data of the first storage unit is rebuilt; and
taking the second storage offline once the first storage unit is online.

4. The method of claim 2, wherein the determining the first to second storage unit transition comprises one of:
determining one or more encoded data slices of the first storage unit needs to be rebuilt before the second storage unit goes offline when a number of online storage units is at or below a read threshold once the second storage unit is offline; and
determining one or more encoded data slices of the first storage unit does not need to be rebuilt before the second storage unit goes offline when the number of online storage units is at or above a write threshold once the second storage unit is offline.

5. The method of claim 1 further comprises:
prior to bringing, by the computing device, the first storage unit online:
determining, during a write request, the first storage unit of the set of storage units is offline;
determining to store encoded data slices of the write request to be stored in the first storage unit in another storage unit of the set of storage units; and
determining the rebuilding approach for the encoded data slices includes transferring storage of the encoded data slices stored from the other storage unit to the first storage unit.

6. The method of claim 1, wherein the rebuilding approach comprises one or more of:
an expedited rebuilding procedure;
a normal rebuild procedure;

a full rebuilding technique; and
a partial rebuilding technique.

7. The method of claim 1 further comprises:
when bringing the first storage unit and a third storage unit of the set of storage units online, in accordance with the selectively bringing online and taking offline storage units, determining, by the computing device, a second rebuilding approach of the first and third storage units; and
bringing, by the computing device, the first and third storage units online in accordance with the second rebuilding approach.

8. The method of claim 7 further comprises:
concurrently rebuilding, according to the second rebuilding approach, one or more sets of encoded data slices of the first and third storage units that need rebuilding.

9. A computing device of a dispersed storage network (DSN) comprises:
memory;
an interface; and
a processing module operably coupled to the interface and memory, wherein the processing module is operable to:
rotate offline storage units of a set of storage units of the DSN by selectively bringing online and taking offline storage units of the set of storage units, wherein the selectively bringing online and taking offline storage units comprises one or more of a scheduled timeframe, an amount of power consumed by a storage unit of the set of storage units, an amount of data written to a storage unit of the set of storage units, restricting taking offline a storage unit that includes an encoded data slice that needs rebuilding, restricting taking offline a storage unit that includes an encoded data slice that is critical to a rebuilding of another encoded data slice, and determining a storage unit of the set of storage units will not be available during a scheduled online timeframe;
when bringing a first storage unit of the set of storage units online in accordance with the selectively bringing online and taking offline storage units, determine a rebuilding approach for data stored or to be stored in the first storage unit; and
bring the first storage unit online in accordance with the rebuilding approach.

10. The computing device of claim 9, wherein the processing module is further operable to:
when taking a second storage unit of the set of storage units offline in accordance with the selectively bringing online and taking offline storage units:
determine a first to second storage unit transition;
bring the first storage unit online in accordance with the first to second storage unit transition; and
take the second storage unit offline in accordance with the first to second storage unit transition.

11. The computing device of claim 10, wherein the processing module is operable to determine the first to second storage unit transition comprises one of:
keeping the second storage unit online;
taking the second storage unit offline after data of the first storage unit is rebuilt; and
taking the second storage offline once the first storage unit is online.

12. The computing device of claim 10, wherein the processing module is operable to determine the first to second storage unit transition comprises one of:
determining one or more encoded data slices of the first storage unit needs to be rebuilt before the second storage unit goes offline when a number of online storage units is at or below a read threshold once the second storage unit is offline; and
determining one or more encoded data slices of the first storage unit does not need to be rebuilt before the second storage unit goes offline when the number of online storage units is at or above a write threshold once the second storage unit is offline.

13. The computing device of claim 9, wherein the processing module is further operable to:
prior to bringing the first storage unit online:
determine, during a write request, the first storage unit of the set of storage units is offline;
determine to store encoded data slices of the write request to be stored in the first storage unit in another storage unit of the set of storage units; and
determine the rebuilding approach for the encoded data slices includes transferring storage of the encoded data slices stored from the other storage unit to the first storage unit.

14. The computing device of claim 9, wherein the processing module is operable to determine the rebuilding approach comprises one or more of:
an expedited rebuilding procedure;
a normal rebuild procedure;
a full rebuilding technique; and
a partial rebuilding technique.

15. The computing device of claim 9, wherein the processing module is further operable to:
when bringing the first storage unit and a third storage unit of the set of storage units online, in accordance with the selectively bringing online and taking offline storage units, determine a second rebuilding approach of the first and third storage units; and
bring the first and third storage units online in accordance with the second rebuilding approach.

16. The computing device of claim 15, wherein the processing module is further operable to:
concurrently rebuild, according to the second rebuilding approach, one or more sets of encoded data slices of the first and third storage units that need rebuilding.

* * * * *